H. B. CRUM.
HYDRAULIC STEERING GEAR.
APPLICATION FILED MAR. 9, 1920.

1,375,678.

Patented Apr. 26, 1921.

WITNESSES
Geo. N. Naylor
J. C. Ledbetter

INVENTOR
Hollis B. Crum
BY Munn & Co.
ATTORNEYS

UNITED STATES PATENT OFFICE.

HOLLIS B. CRUM, OF BUCYRUS, OHIO, ASSIGNOR TO BUCYRUS MACHINE AND TOOL CO., OF BUCYRUS, OHIO, A CORPORATION OF OHIO.

HYDRAULIC STEERING-GEAR.

1,375,678.         Specification of Letters Patent.     Patented Apr. 26, 1921.

Application filed March 9, 1920. Serial No. 364,437.

*To all whom it may concern:*

Be it known that I, HOLLIS B. CRUM, a citizen of the United States, and a resident of Bucyrus, in the county of Crawford and State of Ohio, have invented a new and Improved Hydraulic Steering-Gear, of which the following is a full, clear, and exact description.

This invention relates to steering gear for vehicles, and more particularly to hydraulic steering gear.

An object of the invention is to produce an improved type of hydraulic steering gear for use on motor cars to supplant the presently used worm and worm wheel type, or worm and segment type of steering gear.

The development of the motor car to its present standard is characterized by marked improvements in practically all the different parts and phases of motor-car design. However, the steering elements of the car have not been materially improved since the first conception of a motor-propelled, steerable vehicle, with the result that automobiles of highly perfected design in present-day use still employ the old steering gear comprising a worm and worm wheel type, or closely kindred modifications thereof.

To those conversant with the subject of automobile engineering, it is a well-known fact that the worm and worm wheel type of steering gears has many disadvantages, in that it is subject to considerable wear, thereby continuously changing the operative relation between the steering wheel and the pivotal front wheels of the motor car; and, furthermore, the worm and wheel, or segment, type steering gear is the recipient of continual and pronounced vibration caused by traveling over the road surface, which acts to exert continual strains throughout the steering-gear mechanism. The worm and worm wheel type of steering gear has a low operating efficiency, being in the neighborhood of fifty per cent., which is not at all in keeping with the other mechanical elements which enter into the construction of a motor car.

It is fitting, therefore, that the primary object of my invention is to produce a new and improved type of steering gear for automobiles which will eliminate the above-mentioned undesirable features which hamper the worm wheel type of gear; and to this end, I prefer to employ a simplified hydraulic pump and fluid motor or actuating means as set forth in the present application.

With the above principal objects and others in view, the invention has relation to the combination and arrangement of parts as defined in the appended claims, set forth in the following specification, and illustrated in the accompanying drawings, wherein:

Figure 1:
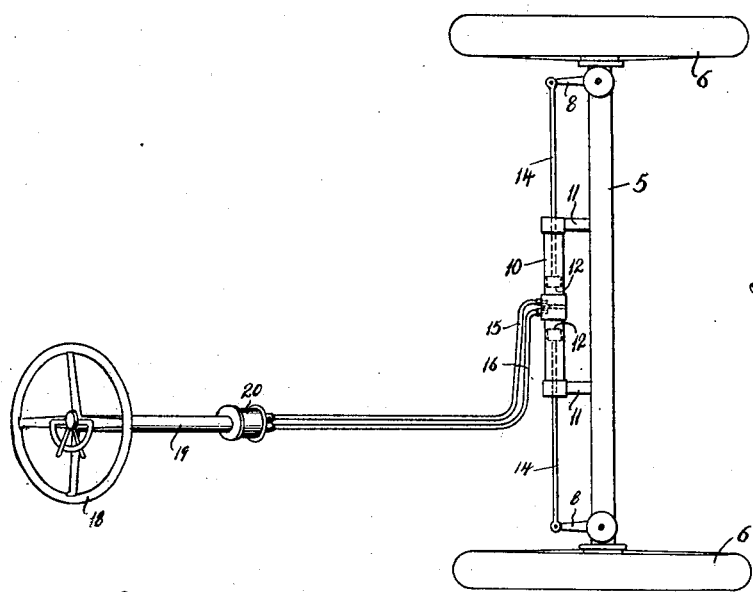
Figure 1 illustrates a plan view of a conventional front axle set removed from the motor car showing a hydraulic steering mechanism connected therewith.
Figure 2:
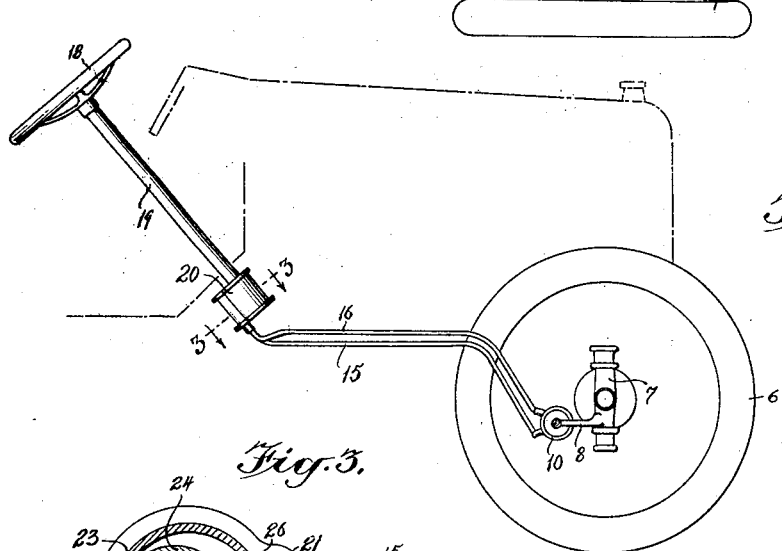
Fig. 2 shows a side elevation of the steering gear parts. These two views are in part diagrammatical illustrations of the invention.

A hydraulic steering gear constructed in accordance with the plans of this invention employs a fluid motor or actuating device carried directly on the front axle of the motor car. The fluid motor has direct connection with the steering knuckles of the two steerable ground wheels. A hydraulic pump of any approved construction is associated with the driver's steering wheel and has a metallic flexible tube connection with the aforesaid fluid motor or actuating device. Other features of construction and advantages of the invention appear hereinafter in further detail.

In presenting a more complete disclosure of the invention, there is shown in the drawings the front axle and wheel set of an automobile, comprising an axle 5 and steerable wheels 6. The wheels are carried upon the usual steering knuckles 7, which are in turn pivotally carried on the axle. Each steering knuckle has an integral arm 8, this construction being common to the front axle and wheel sets of automobiles.

In practising this invention, I have employed a suitable actuating mechanism to transmit motion to the arms 8 to steer the ground wheels 6. It is preferable to employ a hydraulic actuator which receives its power from a pump, as later described. The hydraulic actuator or fluid motor comprises a cylinder 10 secured to the axle 5 in any appropriate manner, such as by using brackets 11 to anchor the cylinder to the axle. A piston in the cylinder may be employed to transmit steering motion to the wheels; however, in the drawings I have shown a pair of pistons 12 in separated relation confined in the cylinder, each of which has a connecting rod 14 projecting from each end of the cylinder 10. Each connecting rod 14 is pivotally tied to the arm 8 of the steering knuckle which carries the ground wheels. In the present apparatus it is preferable to subdivide the cylinder 10 so as to form a separate compartment for each piston 12. A port is made in each cylinder compartment to admit fluid, such as oil, under pressure behind each piston, and to each port is connected a flexible tube 15 and 16. This construction provides a separate fluid-transmitting medium for each cylinder compartment to deliver oil to drive the respective pistons.

Figure 3:
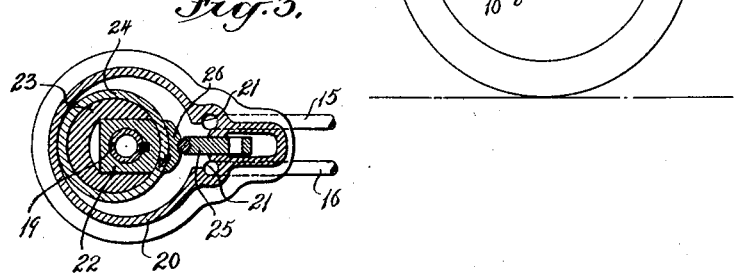
Fig. 3 is presented to illustrate one form of hydraulic pump which I prefer to use in connection with my invention, this view being taken on the line 3—3 of Fig. 2.

A conventional steering wheel 18, fixed to a steering post 19, is employed in an apparatus of this character; and a pump 20 is connected to the lower end of the steering post. The pump may be constructed as portrayed in Fig. 3, wherein the pump casing 20 journals the steering post 19. The casing 20 may be provided with a flange or appropriate bracket for installing said pump on any accessible part of the car.

The character of the pump employed in this apparatus is designed to produce an outflow of oil under considerable pressure to operate the fluid motor 10; and in effecting this purpose, an eccentric hydraulic pump may be used. Passages 21, for the discharge and return of oil, are made in the pump casing, and the aforesaid flexible members 15 and 16 are each connected with one of these passages. The steering post 19 is fixed to a block 22 within the pump casing 20, and this block is fitted to an eccentric plunger 23. The eccentric plunger 23 and block 22 are finished on the periphery thereof to rotatably carry a packing ring 24. This packing ring fits closely to the inner bore of the pump casing and effects a closed, fluid-tight joint therewith. When the eccentric plunger 23 is rotated within the pump casing, the packing ring 24 rolls in close contact and, under slight pressure, against the inner wall of the cylinder to drive the liquid from the pump. A slide 25 and packing plate 26 are designed to work against the outer periphery of the packing ring 24 to form a fluid-tight joint therewith, and to separate the pump casing 20 into two compartments. Each of the aforesaid passages 21 are made within the casing 20 and separated by the slide 25. It is seen how the arrangement of parts divides the pump cylinder into two compartments, each compartment connecting with the respective flexible tubes 15 and 16 which lead the fluid under pressure to the actuator 10.

In the operation of this hydraulic steering mechanism, the driver turns the steering wheel 18 in the usual way, which correspondingly rotates the eccentric plunger 23 in the pump cylinder 20. This action forces the oil from one compartment of the pump out through the flexible tube and simultaneously receives the oil from the actuator cylinder 10 into the other compartment thereof through the other tube. Oil is driven into either one or the other side of the actuator cylinder 10, which moves one of the pistons outwardly from the center of the cylinder, and correspondingly draws the other piston toward the center of the cylinder. This action swings the steering knuckles 7 and wheels 6 in steering relation relatively to the axle 5, thus accomplishing the steering operation from the driver's wheel 18 through the fluid medium contained within the hydraulic system.

Some automobile manufacturers, and particularly those who build cars for foreign countries, find it necessary to construct right-hand controlled steering apparatus. The present invention is characterized by its simplicity in adaptation to this requirement, inasmuch as the simple interchanging of the flexible tubes 15 and 16 either at the pump or actuator will convert the hydraulic steering system to either right-hand or left-hand drive.

The flexible tubes permit relative motion between the automobile body, which carries the steering post, and the running gear, which carries the actuator mechanism; and in this arrangement there is not established a positive connection between the vibrating body carried on the springs of the vehicle and the chassis. This arrangement serves to obviate the disadvantage incident to a vehicle which employs the worm wheel and segment type of steering gear.

In driving over rough and irregular road surfaces, the continual side stresses, vibrations and turning tendency exerted by the wheels 6 are yieldably absorbed by the fluid in the actuator cylinder. This accomplishment of the hydraulic steering gear system relieves the driver from the annoyance of the jerking strain impressed into the steering wheel 18 from many of the well-known worm and segment types of steering gear. The apparatus is simple in construction, positive in operation, and is capable of a broad range of uses in the motor-car industry by its adaptation to pleasure cars, trucks and tractors.

Having thus described my invention, I desire to claim and secure by Letters Patent:

1. The combination with a steerable wheel axle set and steering post of a vehicle, of a pump casing, said steering post journaled in said pump casing, an eccentric plunger within the pump casing carried by the steering post, and means operatively connecting the pump casing and steerable wheel axle set.

2. The combination with a steerable wheel axle set and steering post of a vehicle, of a pump casing, said steering post journaled in said pump casing, an eccentric plunger within the pump casing carried by the steering post, said eccentric plunger dividing the casing into two compartments, a fluid motor operatively mounted on the wheel axle set, and flexible tubular connecting devices connecting the compartments of the pump casing with fluid motor.

3. A steering mechanism in combination with the steerable wheel axle set and steering post of a vehicle, comprising a pump casing, an eccentric plunger confined in the pump casing and fixed to the steering post, a fluid motor mounted on the axle set to steer the wheels, and a tubular connection established between the fluid motor and the pump whereby the eccentric plunger forces fluid from the pump to the motor.

4. A steering mechanism in combination with the steerable wheel axle set and steering post of a vehicle, comprising a pump carried on the steering post, a plunger within the pump and actuated by the steering post, said pump divided into two compartments having a fluid passage in each compartment, a fluid motor carried on the axle and connecting with the vehicle wheels, and a tube connection established between the fluid motor and each fluid passage whereby turning the steering post forces fluid from one of the pump compartments into the fluid motor and receives fluid into the other compartment from the fluid motor.

HOLLIS B. CRUM.